(12) United States Patent
Lee

(10) Patent No.: US 6,190,553 B1
(45) Date of Patent: Feb. 20, 2001

(54) PURIFICATION SYSTEM FOR DISPOSAL OF POLLUTED OR WASTE WATER USING WATER PLANTS

(75) Inventor: Sang Eul Lee, Choongbuk (KR)

(73) Assignee: Sangeul Lee, Choongbuk (KR)

( * ) Notice: Under 35 U.S.C. 154(b), the term of this patent shall be extended for 0 days.

(21) Appl. No.: 09/336,714

(22) Filed: Jun. 21, 1999

(30) Foreign Application Priority Data

Dec. 1, 1998 (KR) .................................................. 98-52702

(51) Int. Cl.⁷ ......................................................... C02F 3/32
(52) U.S. Cl. ................................................................ 210/602
(58) Field of Search .................................... 210/602, 620

Primary Examiner—Chester T. Barry
(74) Attorney, Agent, or Firm—Dickinson Wright PLLC

(57) ABSTRACT

The present invention provides a water plant treatment system in which the nitrogen and phosphorus components and other contamination substances are removed from the water which has been treated biologically by the conventional system. The water plant treatment system according to the present invention includes a distribution section for temporarily storing the incoming waste water to distribute it to the next stages, a first section for filtering the waste water of the distribution section by means of a filtering layer, and for eliminating the nitrogen and phosphorus components by the water caltrops of the filtering layer, a second section with water hyacinths planted therein, for purify the water coming from the first section, a third section with great duckweeds planted on the water surface thereof, for purifying the water coming from the second section, and a fourth section with a filtering layer disposed therein and with water caltrops planted therein.

26 Claims, 5 Drawing Sheets

PURIFICATION SYSTEM FOR DISPOSAL OF POLLUTED OR WASTE WATER USING WATER PLANTS

FIELD OF THE INVENTION

The present invention relates to a water treatment system for treating polluted or waste water. More particularly, the present invention relates to a water treatment system using water plants, which treats the water that had been biologically treated in a conventional waste water treatment system that decomposes organic matters using water microbes, thereby eliminating nitrogen and phosphorus components existing in water. Further, the present invention relates to a method of purifying the water that had been biologically treated in a conventional waste water treatment system that decomposes organic matters using water microbes, thereby eliminating nitrogen and phosphorus components existing in water, of which purification is carried out in the plurality of water plant sections.

BACKGROUND OF THE INVENTION

In these days, various kinds of waste water and contaminated water contaminate the rivers and soils, and how to handle this problem has become a serious matter. The waste water discharged from the homes of urban areas and the waste water discharged from factories and other facilities are doubling their seriousness everyday. Particularly, schools, tenting open fields, hot springs, golf courses, factory areas, cattle feces treating facilities, livestock waste material treating facilities and the like discharge large volumes of waste water to contaminate the rivers and soils. Therefore, an effective treatment of this waste water has become an urgent problem.

In treating the waste water, the biological method has been widely utilized so far. In the biological treatment method, microbes are utilized to make the contaminants decomposed, thereby lowering the BOD (biological oxygen demand). Generally, the conventional biological treating facility includes: a storage tank for temporarily storing the incoming waste water; an aeration tank for decomposing the organic materials by utilizing microbes; a sedimentation tank for precipitating the sludge; and a final storage tank for temporarily storing the treated water.

The biologically treated water is made to flow away to rivers and the sea, or it is treated for the second time before it is discharged to the rivers and the sea. In the biologically treated water, the organic substances are mostly eliminated, but considerable amounts of nitrogen and phosphorus remain. The remaining nitrogen and phosphorus synthesize organic matters such as vegetable plankton and moss, with the result that the green water is generated.

In order to remove nitrogen and phosphorus from the biologically treated water, there have been attempted various methods, but none of them has been successful so far. One of the attempted methods is that in which a second treatment is carried out by employing a sand filtering and an active filtering. In this method, however, various disadvantages are accompanied such as a low treatment efficiency, a high operating and facility cost, and a fastidious operating technique. Therefore, this method could not be put to the practical use. In another method, special plants such as dropworts or the like are experimentally tried. For example, dropworts are planted in a wide wet field to make the dropworts absorb nitrogen or phosphorus components. Or other plants are planted for the same purpose. In this method, however, the treatment efficiency is low, and furthermore, these plants are withered to death in winter seasons. Thus this method has been proved to be not reliable.

In this context, the present inventor has developed a system which can be added to the biologically treating facility to remove the remaining nitrogen and phosphorus components.

OBJECTS OF THE INVENTION

An object of the invention is to provide a water-plants treatment system which can remove nitrogen and phosphorus components further from the water which had been treated by a conventional biological water treatment system.

Another object of the invention is to provide a water-plants treatment system which can be installed to the conventional biological water treatment system additionally or together.

A further object of the invention is to provide a water-plants treatment system which can remove untreated nitrogen and phosphorus components with an high efficiency from the water which had been treated by a conventional biological water treatment system.

A further object of the invention is to provide a water-plants treatment system which can operate during all four seasons as growing water-plants even in winter season using waste heat from the biological treatment system.

A further object of the invention is to provide a environmentally suitable water treatment system because nitrogen and phosphorus components are removed only by using water-plants, but not by any chemicals.

A further object of the invention is to provide a water-plants treatment system which is moderate in construction and operation cost, good in durability, and easy in operation management.

A further object of the invention is to provide a water-plants treatment system which can maximize its purification efficiency having slow filtering method and reverse flow washing.

Other objects and advantages of this invention will be apparent from the ensuing disclosure and appended claims.

SUMMARY OF THE INVENTION

The present invention provides a water plant treatment system 5 in which the nitrogen and phosphorus components and other contamination substances are removed from the water which has been treated biologically by the conventional system. The water plant treatment system 5 according to the present invention includes: a distribution section 51 for temporarily storing the incoming waste water to distribute it to the next stages; a first section 52 for filtering the waste water of the distribution section 51 by means of a filtering layer 104a, and for eliminating the nitrogen and phosphorus components by the water caltrops of the filtering layer 104a; a second section 53 with water hyacinths planted therein, for purifying the water coming from the first section 52; a third section 54 with great duckweeds planted on the water surface thereof, for purifying the water coming from the second section, and for vaporizing the nitrogen gas into the external atmosphere based on the de-nitrogenizing reaction method; and a fourth section 55 with a filtering layer 104b disposed therein, for purifying the water coming from the third section, and with water caltrops planted therein, for eliminating the residual nitrogen and phosphorus components.

Thus according to the present invention, the water plant treatment system 5 is installed upon the conventional aeration tank 2, and above the system 5, the green house 22 is installed to cover the system 5, so that the heat generated from the aeration tank 2 can be utilized. In the case where it cannot be installed upon it, the aeration tank 2 may be installed on the basement, while the water plant treatment system 5 may be installed on the top of the building. Thus the hot air from the aerationtank 2 can be transferred through an air ventilation pipe 23 to the water plant treatment system 5 to warm it up.

The filtering layer 104 of the water plant treatment system 5 is installed upon a distribution box 105, and the filtering layer 104 consists of 6 layers. The first layer 201 contains pebbles having an average diameter of 30–60 mm, and the 6th layer contains sands having an average diameter of 0.2–0.45 mm.

The waste water is treated twice by the filtering layer 104a of the first section 52 and by the filtering layer 104b of the fourth section 55. Therefore, the contaminants can be filtered completely. The water velocity during the passing through the filtering layer 104 is 5–30 m/day, thereby providing a slow filtering method.

If the contamination materials are accumulated within the filtering layer 104, then the flow resistance is built up, with the result that the flow velocity is slowed down. Particularly, if the flow velocity through the filtering layer 104a of the first section 52 is slowed down, then the water level of the distribution section 51 is raised. In this case, the automatic valves 114, 115, 116 and 117 are opened, in order that the water of the water plant treatment system 5 be reversely flow to the storage tank 1. By this reverse-flowing water, the foreign materials which have been accumulated in the filtering layer 104 are washed off. When the reverse flow system completes its operation, the automatic valves 114, 115, 116 and 117 are closed, and the purifying operation is resumed.

A better understanding of the water-plants treatment system of the present invention maybe had by reference to the drawings wherein.

DETAILED DESCRIPTION OF THE PREFERRED EMBODIMENT

The waste water discharged from the homes of urban areas, and various kinds of waste water and contaminated water discharged from schools, tenting open fields, hot springs, golf courses, factory areas, cattle feces treating facilities, livestock waste material treating facilities and the like are biologically treated once, and then are let to flow to rivers and the sea. Generally, the conventional biological treating facility includes: a storage tank for temporarily storing the incoming waste water; an aeration tank for decomposing the organic materials by utilizing microbes; a sedimentation tank for precipitating the sludge; and a final storage tank for temporarily storing the treated water. In the aeration tank, the organic substances are decomposed by microbes, and therefore, carbon dioxide is produced there, while oxygen is consumed.

The conventional biologically treated water contains considerable amounts of organic substances, and nitrogen and phosphorus components. Particularly, the remaining nitrogen and phosphorus synthesize organic matters such as vegetable plankton and moss, with the result that the green water is generated, thereby contaminating the water.

In the present invention, the biologically treated water is re-treated by utilizing water plants, and thus the remaining nitrogen and phosphorus components are eliminated.

Figure 1:
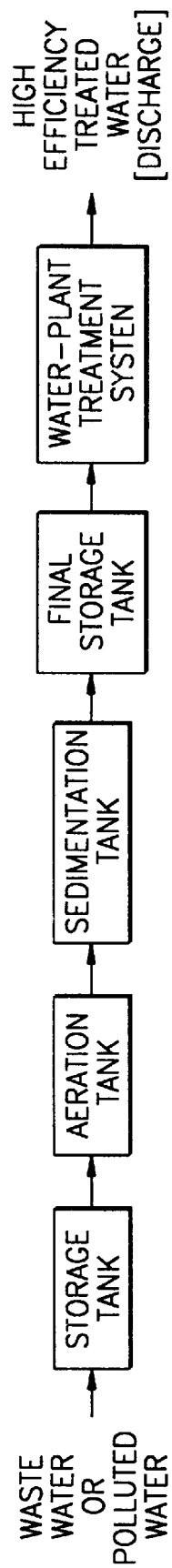
FIG. 1 is a schematic block diagram of a waste water treatment system that a water-plants treatment system of this invention is adopted to a conventional waste water treatment system.
Figure 2:
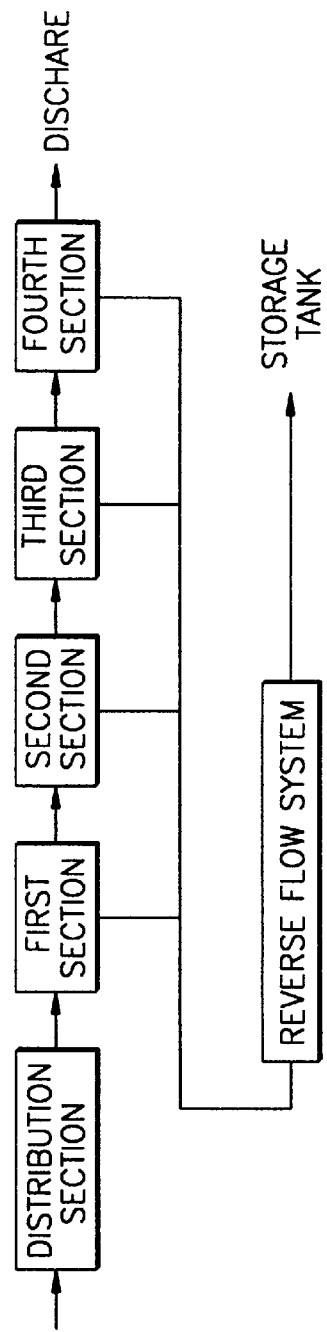
FIG. 2 is a schematic block diagram of a water-plants treatment system according to the present invention.

FIG. 1 is a block diagram showing the constitution of the water plant treatment system according to the present invention. FIG. 2 is a block diagram showing the water plant treatment system according to the present invention. This system includes: a distribution section; first section to fourth section, with the microbes acting therein; and a reverse flow system for making the water of the first to fourth sections flow reversely.

Figure 3:
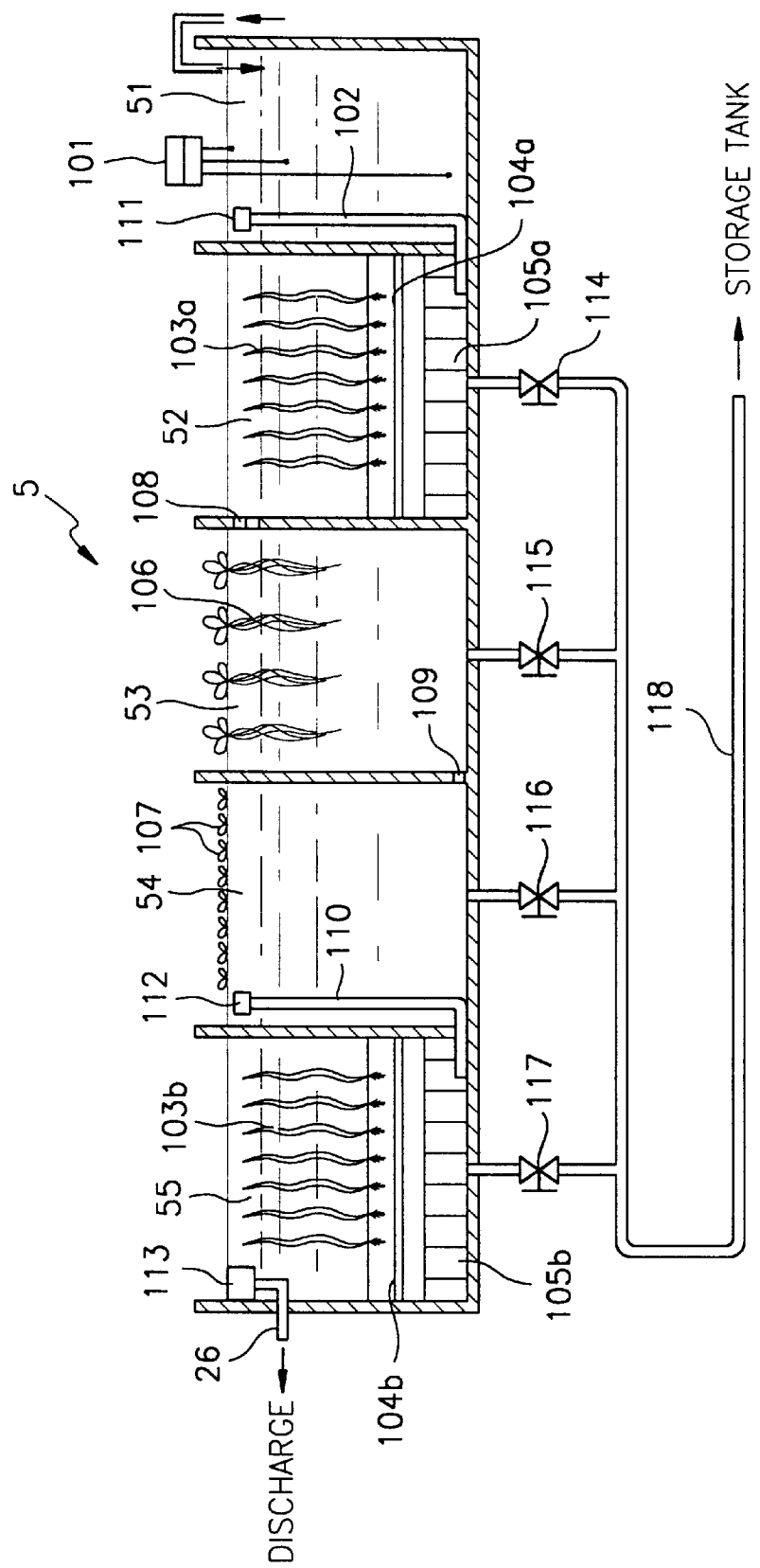
FIG. 3 is a schematic cross-sectional view of a water-plants treatment system according to the present invention.
Figure 4:
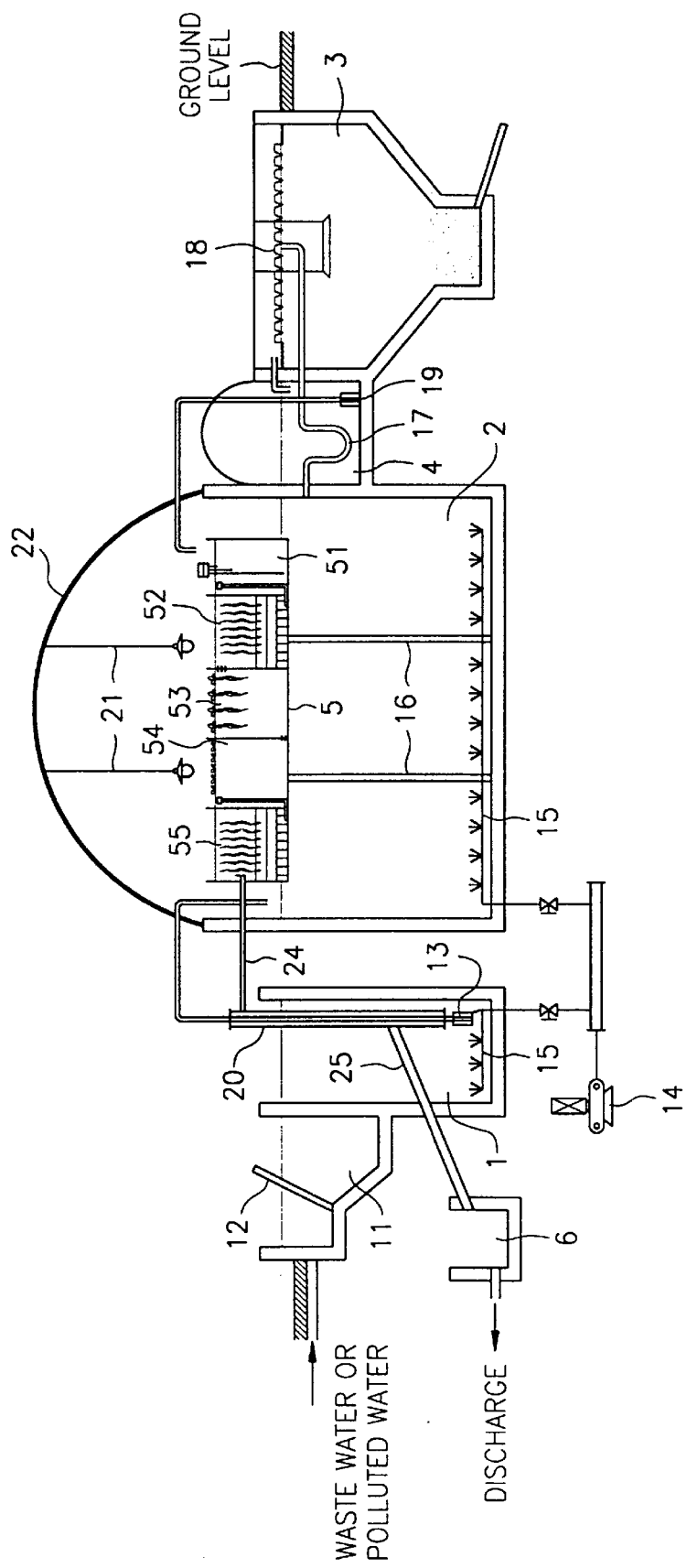
FIG. 4 is a schematic cross-sectional construction view representing one embodiment of a waste water treatment system that a water-plants treatment system of this invention is installed over a conventional waste water treatment system.

FIG. 3 is a schematic sectional view of the water plant treatment system according to the present invention. FIG. 4 illustrates an example in which the water plant treatment system is added to the conventional biological treatment system.

As shown in FIG. 4, the waste water is stored in the storage tank 1, and the waste water is transferred to an aeration tank 2 by pumps 13. The organic substances are decomposed by the microbes in the aeration tank 2, and the treated water is transferred through a U-pipe to a sedimentation tank 3. In the sedimentation tank, the sludge is sunk to the bottom of the tank, and the treated water is transferred through a weir 18 to a final storage tank 4 to be stored there.

Upstream of the storage tank 1, there can be disposed a pre-storage tank 11 having a screen 12, so that solid materials can be filtered off. Beneath the storage tank 1 and the aeration tank 2, there is installed an aerator 15 which spouts air by means of a blower 14. The reason why the air is spouted in the storage tank 1 by means of the aerator 15 is that the stinking and precipitating of the water should be prevented, thereby homogenizing the waste water. The reason why the air is spouted in the aeration tank 2 is that the organic substances have to be decomposed by the microbes. In the aeration tank 2, the organic substances are decomposed by aerobic microbes, and therefore, oxygen is consumed there, while carbon dioxide is produced. Generally, the aeration tank 2 consists of several tanks, and heat is generated there. For this reason, a hot air stream rises through the top of the tanks.

When the biological treatment is completed in the aeration tank 2, the treated water flows through the U-pipe 17 into the final storage tank 4. The U-pipe 17 is for dissipating the generated heat. In the sedimentation tank 3, the sludge is precipitated to the bottom of the tank so as to be discharged to the outside. The treated water of the sedimentation tank 3 is transferred through the weir 18 to the final storage tank 4, and the treated water is supplied by the pumps 19 to a water plant treatment system 5.

The treated waste water is temporarily stored in the water plant treatment system 5, with a certain water level being maintained therein. Then the water is purified in the first to fourth sections 52, 53, 54 and 55 by the water plants, and the finally treated water passes through a pipe 24, a heat exchanger 20 and another pipe 25 to be collected into a discharge tank 6, before being finally let to flow away. The heat exchanger 20 is to raise the temperature of the cold water of the storage tank 1 by utilizing the high temperature of the water of the fourth section 55 of the water plant treatment system 5. This heat exchanger 20 raises the temperature of the cold water in the interval between the storage tank 1 and the aeration tank 2.

The water plant treatment system 5 should be preferably installed upon the aeration tank 2 after covering the aeration tank 2 with concrete. If this method is adopted, the water to be purified can be transferred from the aeration tank 2 to the water plant treatment system 5 without loss of heat. If this kind of installation is impossible, then the installation may be carried out in the following manner.

In the specific example of FIG. 4, the water plant treatment system 5 of the present invention is placed upon the aeration tank 2, and a green house 22 is installed thereupon. Thus the water plant treatment system 5 of the present invention is accommodated within a hothouse. The water plant treatment system 5 has the form of a concrete structure or an FRP structure, and is supported by posts 16. The post 16 may take the form of a ferro-concrete, a steel beam, or a truss structure. This will be easily carried out by those ordinarily skilled in the art. The installation area of the water plant treatment system 5 should be different depending on the capacity of the facility. However, its height should be preferably such that the water depth in the first and fourth sections is 1.2–2.5 m. However, this is not an absolute limit.

The water plant treatment system 5 which is positioned on the upper floor is warmed by the compression heat and friction heat of the blower 14 and by the oxidation heat which is generated by the microbes in the aeration tank 2. The system 5 is further warmed by the heat of the hothouse of the green house. Therefore, the water plants should be grown all the year round without introduction of an external energy. The water plants show a lowered carbon assimilation on a cloudy day or on a rainy day, and therefore, a plurality of electric bulbs 21 may be installed, thereby supplying the required light amount. This water plant treatment system 5 will be described in further details later referring to FIG. 3.

Figure 5:
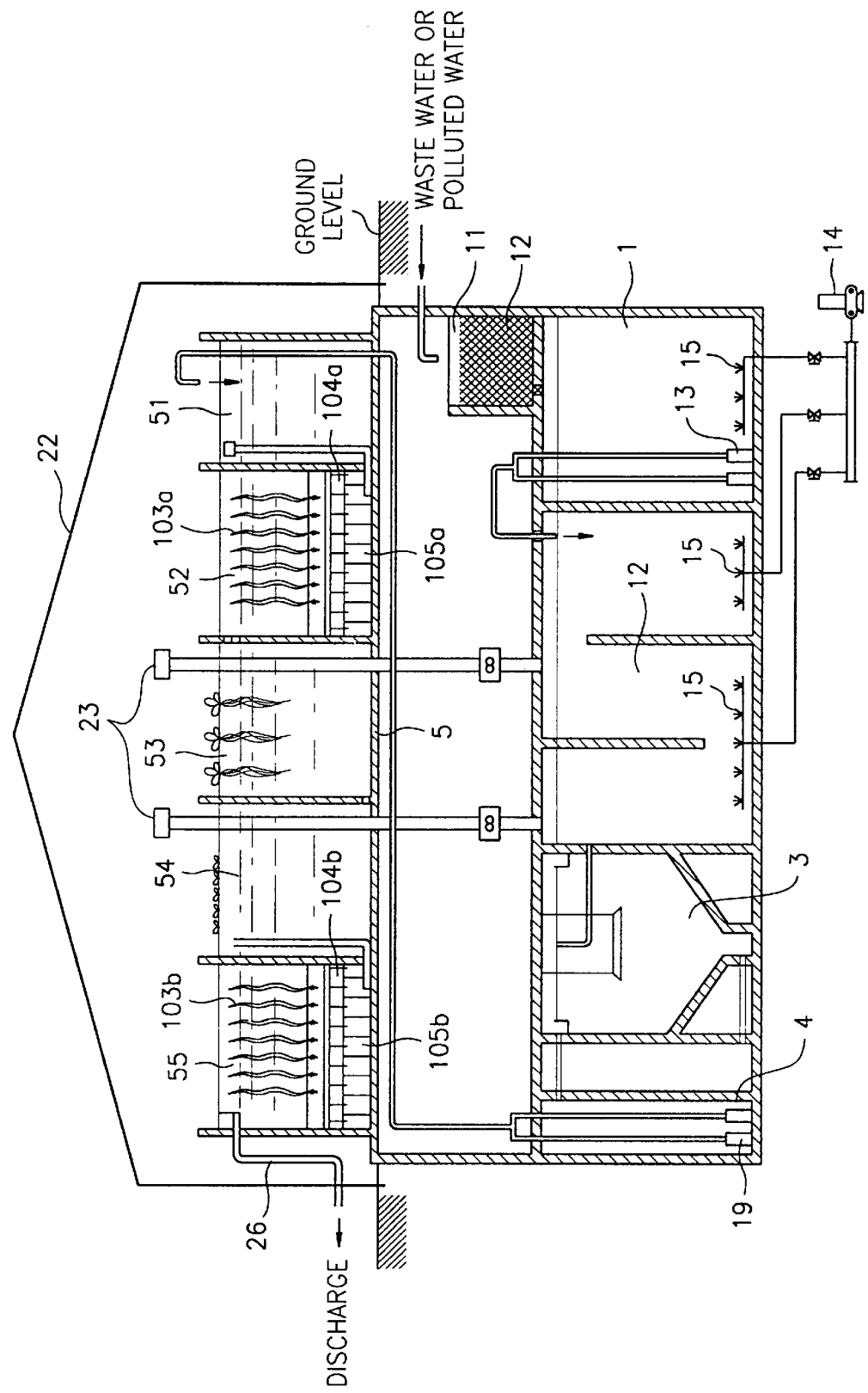
FIG. 5 is a schematic cross-sectional construction view representing another embodiment of a waste water treatment system that a water-plants treatment system of this invention is installed over a conventional waste water treatment system.

FIG. 5 illustrates a specific example in which the water plant treatment system 5 of the present invention is combined to the conventional biological waste water treatment system. In the example of FIG. 5, the water plant treatment system 5 according to the present invention may not be installed on the top of the aeration tank 2 of the conventional biological treatment system. Or if it cannot be installed upon it, the aeration tank 2 may be installed on the basement, while the water plant treatment system 5 is installed on the top of the building. Thus the hot air from the aeration tank 2 can be transferred through an air ventilation pipe 23 to the water plant treatment system 5 to warm it up.

As shown in FIG. 5, the waste water or the contaminated water is temporarily stored in the storage tank 1, and then it is transferred to the aeration tank 2 by a pump 13, so that the organic materials of the waste water can be decomposed by the microbes. The water which has been treated is transferred to the sedimentation tank 3 where the sludge is sunk to the bottom. Then the water thus treated is transferred to the final storage tank 4 so as to be transferred to the distribution section 51 of the water plant treatment system 5 by the pump 19.

A pre-storage tank 11 may be disposed upstream of the storage tank 1, so that solid materials of the waste water can be filtered off. Downstream of the storage tank 1 and the aeration tank 2, there is disposed an aerator 15 in which the air is spouted by means of a blower 14. The aeration tank 2 consists of usually several tanks. Within the aeration tank 2, there are produced an oxidation heat (by the microbes), a compression heat and a friction heat (by the blower 14). This heat is transferred to the green house 22 within which the water plant treatment system 5 is installed.

The treated waste water is temporarily stored in the water plant treatment system 5, with a certain water level being maintained in the distribution section 51. Then the water is purified in the first to fourth sections 52, 53, 54 and 55 by the water plants, and the water thus treated is let to flow away. The green house 22 accommodates the water plant treatment system 5 of FIG. 5, and thus, the water plant treatment system 5 is disposed within a hothouse. In the specific example of FIG. 5, the oxidation heat (by the microbes) and the compression heat and the friction heat (by the blower 14) are transferred from the aeration tank 2 to the green house 22 within which the water plant treatment system 5 is accommodated. Thus the water plant treatment system 5 is maintained at a warmed-up state. Moreover, the green house 22 further helps in warming up the water plant treatment system 5, so that the water plants may grow without the supply of any other external energy.

FIG. 3 is a schematic sectional view of the water plant treatment system 5 according to the present invention. In the water plant treatment system 5, the nitrogen and phosphorus components and other contamination substances are removed from the water which has been treated biologically by the conventional system. The present invention provides a water plant treatment system 5 in which the nitrogen and phosphorus components and other contamination substances are removed from the water which has been treated biologically by the conventional system. The water plant treatment system 5 according to the present invention includes: a distribution section 51 for temporarily storing the incoming waste water to distribute it to the next stages; a first section 52 for filtering the waste water of the distribution section 51 by means of a filtering layer 104a, and for eliminating the nitrogen and phosphorus components by the water caltrops of the filtering layer 104a; a second section 53 with water hyacinths planted therein, for purify the water coming from the first section 52; a third section 54 with great duckweeds planted on the water surface thereof, for purifying the water coming from the second section, and for vaporizing the nitrogen gas into the external atmosphere based on the de-nitrogenizing reaction method; and a fourth section 55 with a filtering layer 104b disposed therein, for purifying the water coming from the third section, and with water caltrops planted therein, for eliminating the residual nitrogen and phosphorus components.

Thus according to the present invention, the water plant treatment system 5 is installed upon the conventional aeration tank 2, and above the system 5, the green house 22 is installed to cover the system 5, so that the heat generated from the aeration tank 2 can be utilized. In the case where it cannot be installed upon it, the aeration tank 2 may be installed on the basement, while the water plant treatment system 5 may be installed on the top of the building. Thus the hot air from the aeration tank 2 can be transferred through an air ventilation pipe 23 to the water plant treatment system 5 to warm it up.

The filtering layer 104 of the water plant treatment system 5 is installed upon a distribution box 105, and the filtering layer 104 consists of 6 layers. The first layer 201 contains pebbles having an average diameter of 30–60 mm, and the 6th layer contains sands having an average diameter of 0.2–0.45 mm.

The waste water is treated twice by the filtering layer 104a of the first section 52 and by the filtering layer 104b of the fourth section 55. Therefore, the contaminants can be filtered completely. The water velocity during the passing through the filtering layer 104 is 5–30 m/day, thereby providing a slow filtering method.

If the contamination materials are accumulated within the filtering layer 104, then the flow resistance is built up, with the result that the flow velocity is slowed down. Particularly, if the flow velocity through the filtering layer 104a of the first section 52 is slowed down, then the water level of the distribution section 51 is raised. In this case, the automatic valves 114, 115, 116 and 117 are opened, in order that the water of the water plant treatment system 5 be reversely flow to the storage tank 1. By this reverse-flowing water, the foreign materials which have been accumulated in the filtering layer 104 are washed off. When the reverse flow system completes its operation, the automatic valves 114, 115, 116 and 117 are closed, and the purifying operation is resumed.

Figure 6:
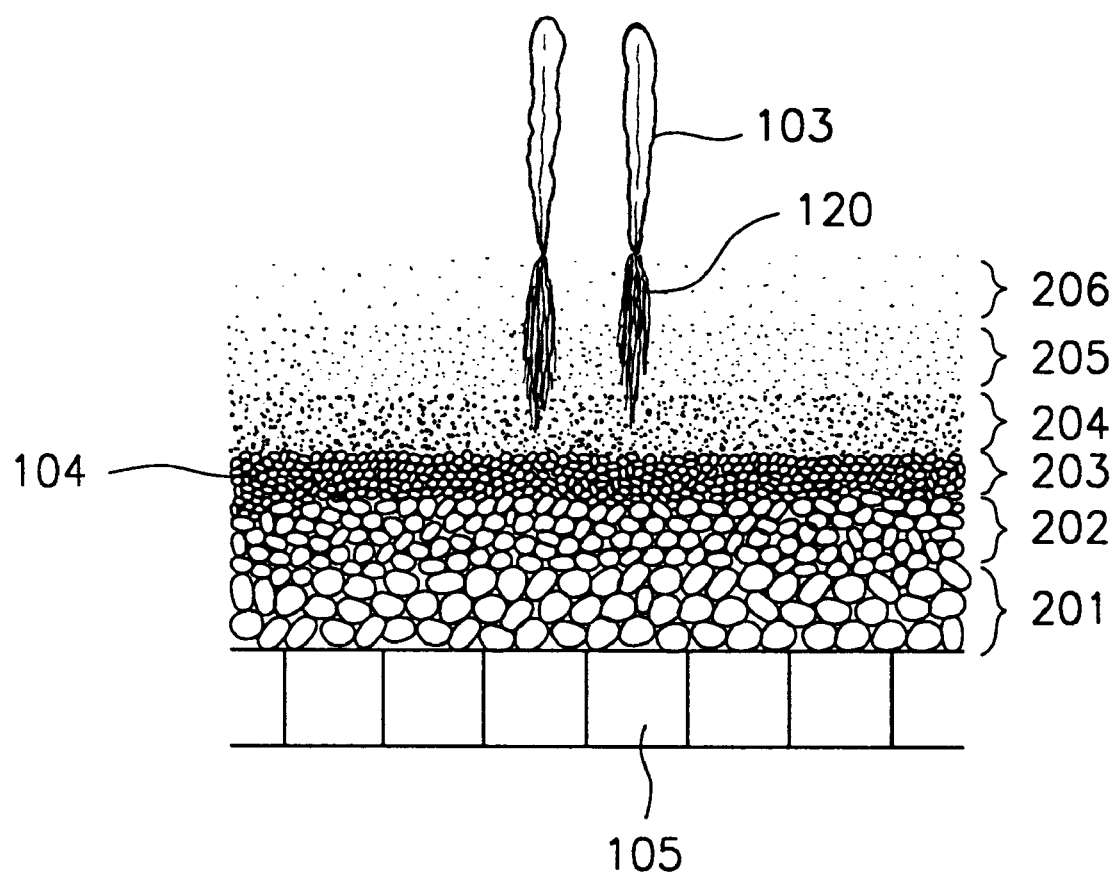
FIG. 6 is a schematic cross-sectional view representing the structure of the filtration layer applying to a first and a fourth sections of this water-plants treatment system.

The water which has been introduced into the distribution section 51 is transferred through the discharge weir 111 and through a plurality of discharge pipes 102 to a distribution box layer 105a which is installed beneath the first section 52. Then the water passes through the filtering layer 104a upward. During the passing of the water, organic substances adhere on the pebbles and sands, and these organic substances are decomposed by microbes. The filtering layer 104 is a well known technique in the water supply field, but this technique is adopted first by the present inventor for purifying the waste water. FIG. 6 is a schematic sectional view showing the constitution of the filtering layer which is disposed in the first and fourth sections 52 and 55.

As shown in FIG. 6, the filtering layer 104 is installed upon the distribution box layer 105, and the filtering layer 104 consists of a first layer 201 to a sixth layer 206. In the filtering layer 104 of the first section 52, the first layer contains large pebbles having an average diameter of 30–60 mm, the second layer 202 contains pebbles having an average diameter of 5–30 mm, the third layer 203 contains small pebbles having an average diameter of 5–15 mm, the fourth layer 204 contains coarse sands having an average diameter of 2–5 mm, the fifth layer 205 contains sands having an average diameter of 0.45–0.7 mm, and the sixth layer 206 contains fine sands having an average diameter of 0.3–0.45 mm. The first to fifth layers should preferably have a thickness of 20–50 cm, while the sixth layer should preferably have a thickness of 30–70, but they are not absolutely limited to these thicknesses. The water velocity during the passing through the filtering layer 104 of the first section 52 is 5–30 m/day, thereby providing a slow filtering method. Therefore, during the passing through this layer, most of the contaminants are removed. More preferably, the flow velocity through the filtering layer 104 should be 10 m/day.

During the filtering, the roots of the water caltrops grow in the 6th and 5th layers 206 and 205, and the water caltrops flourishes in the water of the 6th layer 206. The water caltrops absorb the nitrogen and phosphorus components, and due to the metabolism of this plant, carbon dioxide is consumed, while oxygen is produced. As a result, the first section 52 maintains an aerobic state under the sun beams or under an artificial illumination. During nights, oxygen is artificially supplied.

The water which has been treated by the first section 52 flows through a horizontal weir 108 to the second section 53. In the second section 53, there are planted water hyacinths 106. The water hyacinths expose their leaves on the water surface, while their roots extend into the water. In the second section 53, the roots of water hyacinths absorb the nitrogen and phosphorus components, and the solution of oxygen is inhibited by them, while oxygen is consumed by the microbes. Their roots are profuse, lengthy and fiber-like, and therefore, these roots act as a contact medium for the microbes, while accommodating large amounts of microbes. Thus the consumption of oxygen is promoted. Therefore, the second section is lead to an anaerobic state.

The water which has been treated by the second section 53 flows through a plurality of paths 109 to the third section. In the third section, there are planted great duckweeds 107. The great duckweeds expose their leaves on the water surface, while extending their roots into the water. The roots of the great duckweeds are far shorter than those of the water hyacinths. In the third section 54, the roots of the great duckweeds absorb the nitrogen and phosphorus components, while the leaves of them block oxygen from entering into the water. Therefore, the third section 54 maintains a de-oxidized state.

The water which has been treated by the third section 54 flows through a discharge weir 112 and a plurality of discharge pipes 110 to the fourth section 55. The constitution of the fourth section 55 is similar to that of the first section 52. However, the water which is introduced into the fourth section 55 has been treated by the first to third sections, and therefore, its filtering layer 104b is slightly different from that of the first section 52. That is, the 6th layer 206 of the filtering layer 104a of the first section 52 contains sands having an average diameter of 0.3–0.4 mm, whereas the 6th layer 206 of the filtering layer 104b of the fourth section 55 contains sands having an average diameter of 0.2–0.3 mm. The water which has been treated by the fourth section 55 is let to flow away through a discharge pipe 26.

If the contamination materials are accumulated within the filtering layer 104, then the flow resistance is built up, with the result that the flow velocity is slowed down. Particularly, if the flow velocity through the filtering layer 104a of the first section 52 is slowed down, then the water level of the distribution section 51 is raised. If the distribution section 51 reaches a certain level, a water level controller 101 is activated to open the automatic valve 114. The water level controller 101 and the automatic valve 114 are automatically activated by a controller(not shown), and this controller can be formed by those ordinarily skilled in the art. If the automatic valve 114 is opened, the water of the first section 52 and the distribution section 51 is transferred through a reverse flow pipe 118 to the storage tank 1. Under this condition, the foreign materials which have been adhered on the pebbles and sands of the filtering layer 104a are washed off. In the filtering layer 104, there should necessarily be planted water caltrops, and the reason is as follows. That is, the roots of water caltrops are not branched, but extends straight and in parallel. Therefore they show a less resistance against the flow of water, and in the case where some of the roots are selectively removed, they are not entangled, while the roots are easily washed during the reverse flow of the water.

If the valves 115, 116 and 117 are opened to make the water flow reverse, then the second to fourth sections can also be washed. However, the periodic cycle of the wash of the second to fourth sections may be longer than that of the first section. In the case of an ordinary waste water, the reverse flow of the first section may be carried out twice a month, while the reverse flow of the fourth section may be carried out several times a year. However, these periodic cycles may be properly adjusted in accordance with the conditions of the waste water. The automation of the valves 115, 116 and 117 can be easily carried out by utilizing the controller (not shown). When the reverse flow is completed, the automatic valves 115, 116 and 117 are closed, and the purifying operation is resumed.

In the water plant treatment system 5 of the present invention, the water caltrops 103 are planted in the filtering layers 104 of the first and fourth sections 52 and 55, and water hyacinths are planted on the water surface of the second section 53, while great duckweeds are planted on the water surface of the third section 54. In the first and fourth sections 52 and 55, there may be planted moss instead of the water caltrops.

The water caltrops 103 are an annually perishing plant, grow within water, and survive winter seasons to grow slowly. They form fruits in July to August, then the tip portions of the roots are cut off, and the stems float to the water surface, while the fruits are dropped to the bottom to be sprouted later. The stems of the water caltrops are removed by using a rake, and the fruits adhered on the stems are collected to be sown in the next year. Another kind of water caltrops is propagated by the roots. These two kinds of water caltrops may be combinedly used.

The water hyacinths 106 and the great duckweeds 107 are similar in their water treating functions and in the growth characteristics to each other. If the water temperature is kept at 7–8° C. and if sun shine is supplied, they continue the growth and propagation. If the water hyacinths are excessively propagated, part of them may be removed by using a rake, while if the great duckweeds are excessively propagated, a part of them are removed by using a stainless steel net. At a large facility, they are automatically removed by a conveyor means. The management of these water plants will be easily carried out by those ordinarily skilled in the art.

In the water plant treatment system 5 of the present invention, the green house 22 covers the system 5, and the system 5 is internally warmed by the heat generated from the aeration tank 2. Therefore, the day-time temperature can be maintained at 20–30° C., while the night temperature can be maintained at 10–20° C. Therefore, the purifying process of the present invention can be continued even during winter seasons without receiving any external heat.

In the above, the present invention was described based on the preferred embodiment of the present invention, but it should be apparent to those ordinarily skilled in the art that various changes and modifications can be added without departing from the spirit and scope of the present invention. Such changes modifications should come within the scope of the present invention.

What is claimed is:

1. A water-plants water treatment system for purifying the waste water which has been treated by a conventional biological treatment system, comprising:

a distribution section for temporarily storing the incoming waste water from the conventional biological treatment system;

a first section having a filtration layer and water caltrops in the upper part of said filtration layer to filter the first treated water from the distribution section and to remove nitrogen and phosphorus components;

a second section having water hyacinths planted therein, to purify the water coming from the first section;

a third section having great duckweeds planted on the water surface thereof, for purifying the water coming from the second section and for vaporizing the nitrogen gas into the external atmosphere based on the de-nitrogenizing reaction method; and a fourth section having a filtering layer disposed therein and additional water caltrops in the upper part of said filtering layer to filter the water from the third section and to remove nitrogen and phosphorus components.

2. The system as defined in claim 1, wherein said first section has a distributing box installed under said filtration layer and said fourth section has a distributing box installed under said filtering layer.

3. The system as defined in claim 1, wherein said distribution section has a discharge weir and pipes to flow the water to the first section, said first section has a weir to flow the water to the second section, said second section has a passage to flow the water to the third section, said third section has a discharge weir and pipes to flow the water to the fourth section, and said fourth section has a discharge weir and discharge pipes.

4. The system as defined in claim 1, wherein said filtration layer of the first section and said filtering layer of the fourth section are composed of a first layer of large pebbles having an average diameter of 30–60 mm, a second layer of pebbles having an average diameter of 5–30 mm, a third layer of gravel having an average diameter of 5–15 mm, a fourth layer of coarse sand having an average diameter of 2–5 mm, a fifth layer of sand having an average diameter of 0.45–0.7 mm, and a sixth layer of fine sand having an average diameter of 0.3–0.45 mm.

5. The system as defined in claim 4, wherein said first layer through said fifth layer have a thickness in the range of 20–50 cm and said sixth layer has a thickness in the range of 30–70 cm.

6. The system as defined in claim 1, wherein said distribution section has a level controller installed to sense the water level therein.

7. The system as defined in claim 1, further comprising a reverse flow system including a pipe and automatic valves installed to reversely flow the water in the first, second, third and fourth sections.

8. The system as defined in claim 1, wherein said system is installed over an upper part of an aeration tank of the conventional biological water treatment system.

9. The system as defined in claim 8, further comprising a green house installed to cover the system.

10. The system as defined in claim 9, further comprising a plural number of electric bulbs installed in the green house.

11. The system as defined in claim 10, further comprising a plural number of air vent pipes installed to move warm air generated from the aeration tank into the green house.

12. The system as defined in claim 1, wherein said system is supported by a plural number of posts.

13. A process for purifying the waste water which has been treated by a conventional biological treatment system comprising an aeration tank, said process comprising the steps of:

treating the water treated by the conventional biological water treatment system with a filtration layer and water caltrops planted on the filtration layer in a first section;

treating the water treated in the first section with water hyacinths planted in a second section;

treating the water treated in the second section with great duckweeds planted in a third section; and treating the water treated in the third section with a filtering layer and water caltrops planted on the filtering layer in a fourth section.

14. The process as defined in claim 13, further comprising the steps of storing the water treated by the conventional biological water treatment system in a distribution section, and flowing the water to the bottom part of the first section through a first section discharge weir and pipes.

15. The process as defined in claim 13, wherein the water in the first section flows to the second section through a horizontal weir.

16. The process as defined in claim 13, wherein the water in the second section flows to the third section through a passage.

17. The process as defined in claim 13, wherein the water in the third section flows to the fourth section through a fourth section discharge weir and pipes.

18. The process as defined in claim 13, wherein the water in the fourth section is discharged through a discharge weir and discharge pipes.

19. The process as defined in claim 18, wherein said discharged water is recycled to a heat exchanger in the aeration tank.

20. The process as defined in claim 14, wherein said distribution section and said first through fourth sections are kept warm by a green house.

21. The process as defined in claim 20, wherein the warm air generated from the aeration tank flows into the green house.

22. The process as defined in claim 14, wherein the water level of said distribution section is sensed by a level controller and when it reaches a predetermined level, an automatic valve is opened and the water in the first section is discharged through a reverse flow pipe.

23. The process as defined in claim 14, wherein the water level of said distribution section is sensed by a level controller and when it reaches a predetermined level, automatic valves are opened and the water in the first to fourth sections is discharged through a reverse flow pipe.

24. The process as defined in claim 22, wherein said discharged water flows into a storage tank.

25. The process as defined in claim 13, wherein said filtration layer of the first section and said filtering layer of the fourth section are composed of a first layer of large pebbles having an average diameter of 30–60 mm, a second layer of pebbles having an average diameter of 5–30 mm, a third layer of gravel having an average diameter of 5–15 mm, a fourth layer of coarse sand having an average diameter of 2–5 mm, a fifth layer of sand having an average diameter of 0.45–0.7 mm, and a sixth layer of fine sand having an average diameter of 0.3–0.45 mm.

26. The process as defined in claim 25, wherein said first layer through said fifth layer have a thickness in the range of 20–50 cm and said sixth layer has a thickness in the range of 30–70 cm.

* * * * *